United States Patent [19]
Marchese-Ragona et al.

[11] Patent Number: 6,157,450
[45] Date of Patent: Dec. 5, 2000

[54] AUTOMATED OPTICAL SURFACE PROFILE MEASUREMENT SYSTEM

[75] Inventors: Silvio P. Marchese-Ragona, Rochester; Robert Bryant, Honeoye Falls; Matthew E. Seelig, Rochester; Dag Lindquist, Penfield; Donald P. McClimans, Fairport; Edward J. Merritt, Jr., Caledonia; John E. Stephan; John A. Teleska, both of Rochester, all of N.Y.

[73] Assignee: Chapman Instruments, Rochester, N.Y.

[21] Appl. No.: 09/037,202

[22] Filed: Mar. 9, 1998

[51] Int. Cl.[7] .......................... G01B 11/24; G01B 11/00; G01N 21/00
[52] U.S. Cl. ...................... 356/376; 356/372; 356/237.1; 356/237.2
[58] Field of Search .................................. 356/376, 400, 356/399, 237.2, 237.1, 372

[56] References Cited

U.S. PATENT DOCUMENTS

| | | | |
|---|---|---|---|
| 4,644,172 | 2/1987 | Sandland et al. | 356/400 |
| 4,911,033 | 3/1990 | Rosheim et al. | 74/479 |
| 5,017,012 | 5/1991 | Merritt, Jr. et al. | |
| 5,789,890 | 8/1998 | Genov et al. | 318/567 |

Primary Examiner—Frank G. Font
Assistant Examiner—Roy M. Punnoose
Attorney, Agent, or Firm—Harris Beach & Wilcox, L.L.P.

[57] ABSTRACT

A fully automated surface profiling system having a loading chamber and an adjacent measurement chamber containing a phase differential laser optical scanning system and a five-axis positioner having a vacuum chuck for holding and orienting a wafer for surface profile measurement. The positioner can displace a mounted wafer lengthwise and crosswise of the chamber, can rotate the wafer about vertical and horizontal axes through the positioner, and can rotate the wafer about its own axis. Each motion is motor-driven and can be carried out independently of all the others or in compound motion as needed. The positioner can accommodate a series of replaceable chucks for holding wafers of different diameters. The loading chamber has a cassette dock for receiving a cassette containing wafers to be tested, a robotic server, and a prealigner. All operations within the profilometer are controlled by a programmable CPU at a control station. Test results and analysis can be displayed on an onboard monitor or printed out or stored or transmitted. In operation, the robotic server selects a wafer from the cassette, presents the wafer to the prealigner for centering and orientation, and transfers the wafer through a slot into the measurement chamber and installs the wafer on the positioner for measurement. The positioner orients the wafer responsive to program commands from the CPU, and the desired surface profile measurements are made. When all measurements have been completed on a wafer, the robotic server removes the wafer from the positioner, returns it to the cassette, and selects another wafer for testing.

14 Claims, 12 Drawing Sheets

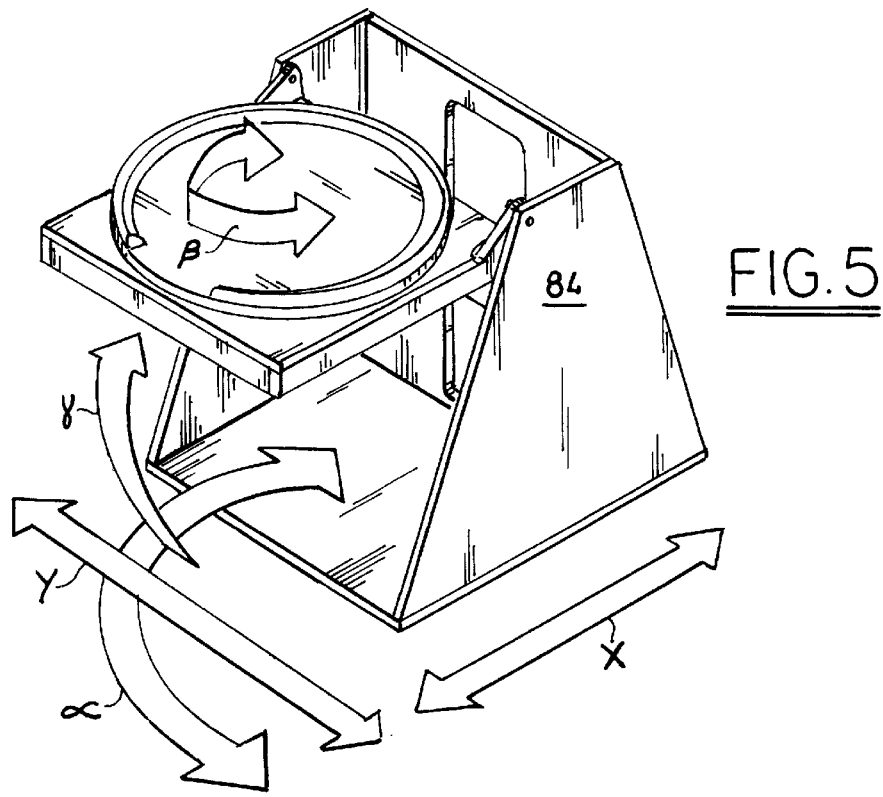
FIG. 5
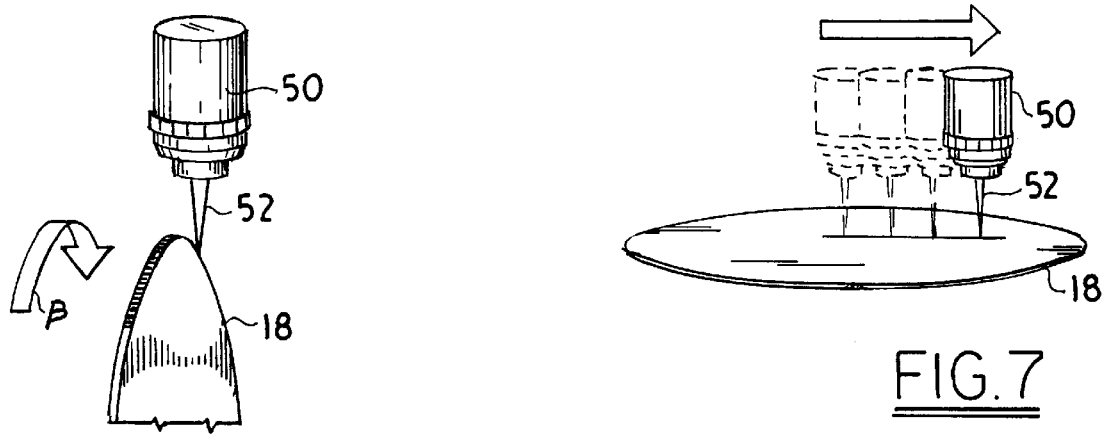
FIG. 6
FIG. 7
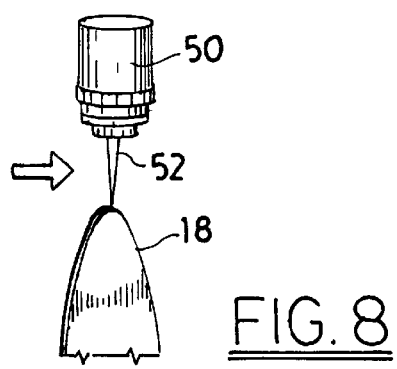
FIG. 8

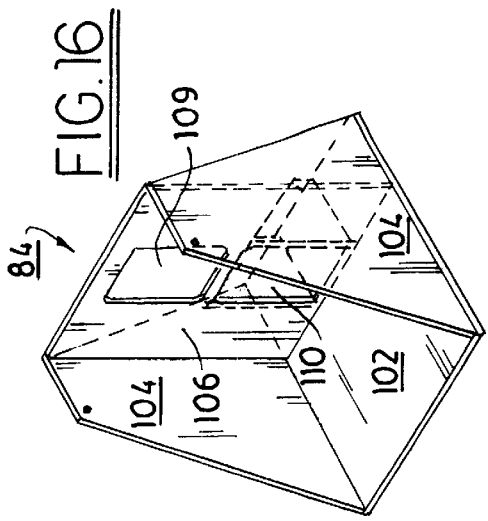
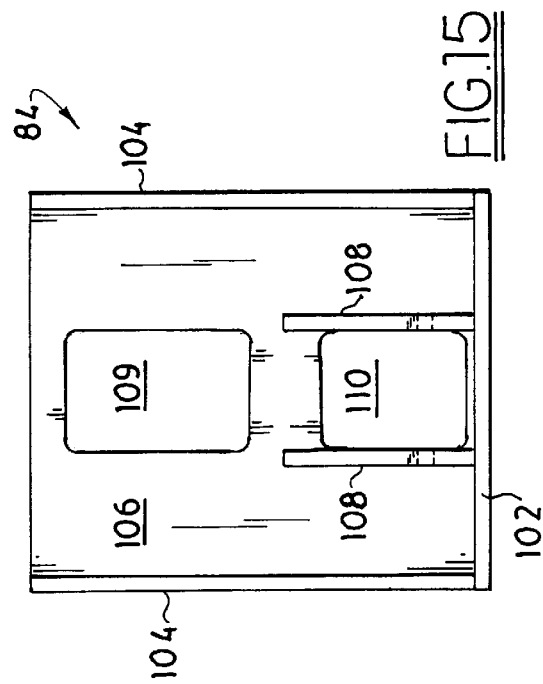
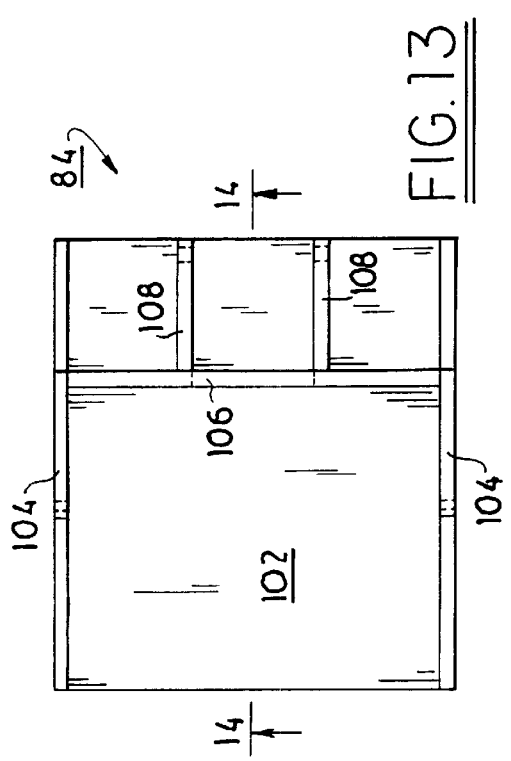
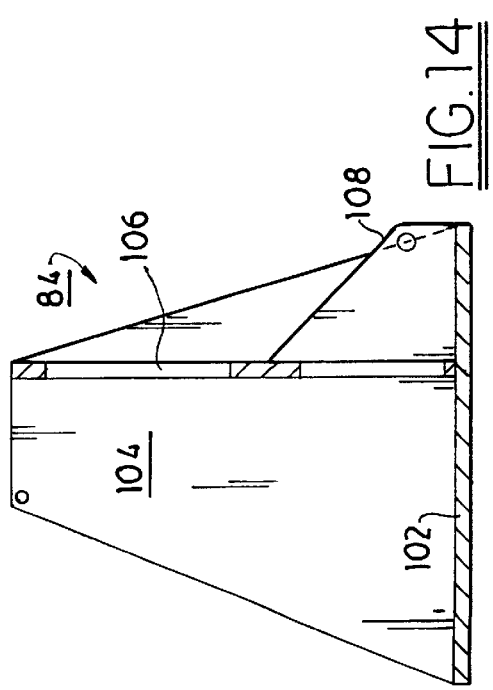

AUTOMATED OPTICAL SURFACE PROFILE MEASUREMENT SYSTEM

DESCRIPTION

The present invention relates to profiling systems and particularly to profilimeters for measurement of the profile of the surface of a member under test to a high resolution (atomic distances or nanometer range). The invention still more particularly relates to a fully automated workstation for receiving, loading, profiling, and unloading a sequential plurality of members. A profilimeter in accordance with the invention is especially suitable for use in accurate, automatic profiling of the working surface, edge bevel, and edge surface (or crown) of wafers used in the manufacture of semiconductor devices such as integrated circuits. Wafers may also be in the form of discs for data storage in computers, generally referred to as "computer hard discs." As used herein, "wafer" refers to any generally disc-shaped substrate having one or more planar, conical, and/or cylindrical surfaces.

Wafers used in many industrial applications require a very high degree of smoothness of the working surface, and typically the smoothness of the edge bevel and of the edge crown itself are also of interest. Because the processes to be performed subsequently on these wafers can be very costly, the initial quality of the surfaces typically must be confirmed for each wafer before it is released for subsequent processing. Machines using phase differential laser profiling are commonly employed for these making measurements, for example, the Chapman Wafer Surface Profiler, Model MP2000 Plus™, which is commercially available from Chapman Instruments, Inc., Rochester, N.Y. USA. This device is a profiler having a phase differential optical profiling system suitably of the type described in U.S. Pat. No. 5,017,012 issued May 21, 1991 and assigned to Chapman Instruments, Inc., which is hereby incorporated herein by reference. Wafers to be profiled are inserted manually into the device, and are retrieved manually after profiling, by an operator using a vacuum wand. Wafers are received in the machine by a vacuum chuck which attaches to the rear (non-working) surface of the wafer. The chuck is an element of a multiple-axis mount through which the operator, by manipulation of vernier knobs on the mount, can position the wafer for laser scanning of a desired surface. The wafer must be repositioned or reoriented by the operator for each successive measurement, which is time-consuming and results in relatively low throughput of the machine.

Thus there is a need for a fully automated profilometer which can receive and scan a plurality of surfaces of a plurality of wafers rapidly and reliably without operator intervention.

It is a principal object of the invention to provide an improved phase differential laser profiling system which can receive a plurality of wafers to be scanned and which can scan a plurality of surfaces on each wafer rapidly and reliably without operator intervention.

It is a further object of the invention to provide an improved phase differential laser profiling system having cassette-to-cassette robotic handling and positioning of a plurality of wafers.

It is a still further object of the invention to provide an improved positioner for a wafer in a profilometer, the positioner having five degrees of motion freedom allowing sequential profiling of any portion of the front surface, the edge bevel, and the edge crown of a wafer in both the axial and the circumferential directions, all without repositioning of the wafer on the positioner.

It is a still further object of the invention to provide a five-axis positioner for a wafer in a profilometer wherein all odes of motion are motorized and computer driven.

Briefly described, a fully automated surface profiling system embodying the invention has a loading chamber and an adjacent measurement chamber. A phase differential laser optical scanning system is disposed in an upper portion of the measurement chamber for scanning wafers and recording optical date reflected therefrom. The measurement chamber contains a five-axis positioner disposable in the optical path and having a vacuum chuck for holding and orienting a wafer for measurement. The positioner can displace a mounted wafer lengthwise and crosswise of the chamber (X and Y directions, respectively), can rotate the wafer about vertical and horizontal axes through the positioner, and can rotate the wafer about its own axis. Each motion is motor-driven and can be carried out independently of all the others, or in compound motion as needed with any or all of the others. The positioner can accommodate any of a series of dedicated replaceable chucks for holding wafers of different diameters. The loading chamber has a dock for receiving a cassette containing a plurality of wafers to be tested, a robotic server, and a prealigner. All operations within the profilometer are controlled by a programmable CPU. Testing results and analysis can be displayed on an onboard monitor, or may be printed out, stored, or electronically transmitted.

In operation, the robotic server selects a wafer for testing from the cassette, presents the wafer to the prealigner for centering and orientation of the wafer with respect to an edge notch, and transfers the wafer from the prealigner through a slot into the measurement chamber and installs the wafer on the vacuum chuck for measurement. When all measurements have been completed, the robotic server removes the wafer from the positioner, replaces it in the cassette, and selects another wafer for testing.

The foregoing and other objects, features, and advantages of the invention, as well as presently preferred embodiments thereof, will become more apparent from a reading of the following description in connection with the accompanying drawings in which:

FIG. 1 is a perspective view of an automated optical surface profile measurement system embodying the invention;

FIGS. 2, 3, and 4 are plan views illustrating the operation of the robotic workpiece loading mechanism in successive operating positions;

FIG. 5 is a diagrammatic perspective view of the workpiece holding and orienting positioner used in the profile measurement system shown in FIGS. 1 through 4;

FIGS. 6, 7, and 8 are respectively diagrammatic views schematically illustrating the operation of the profile measurement system in measuring around the periphery of a wafer workpiece (circumferentially), across the face of the workpiece, and across the width of the edge of the workpiece (axially);

Figure 9:
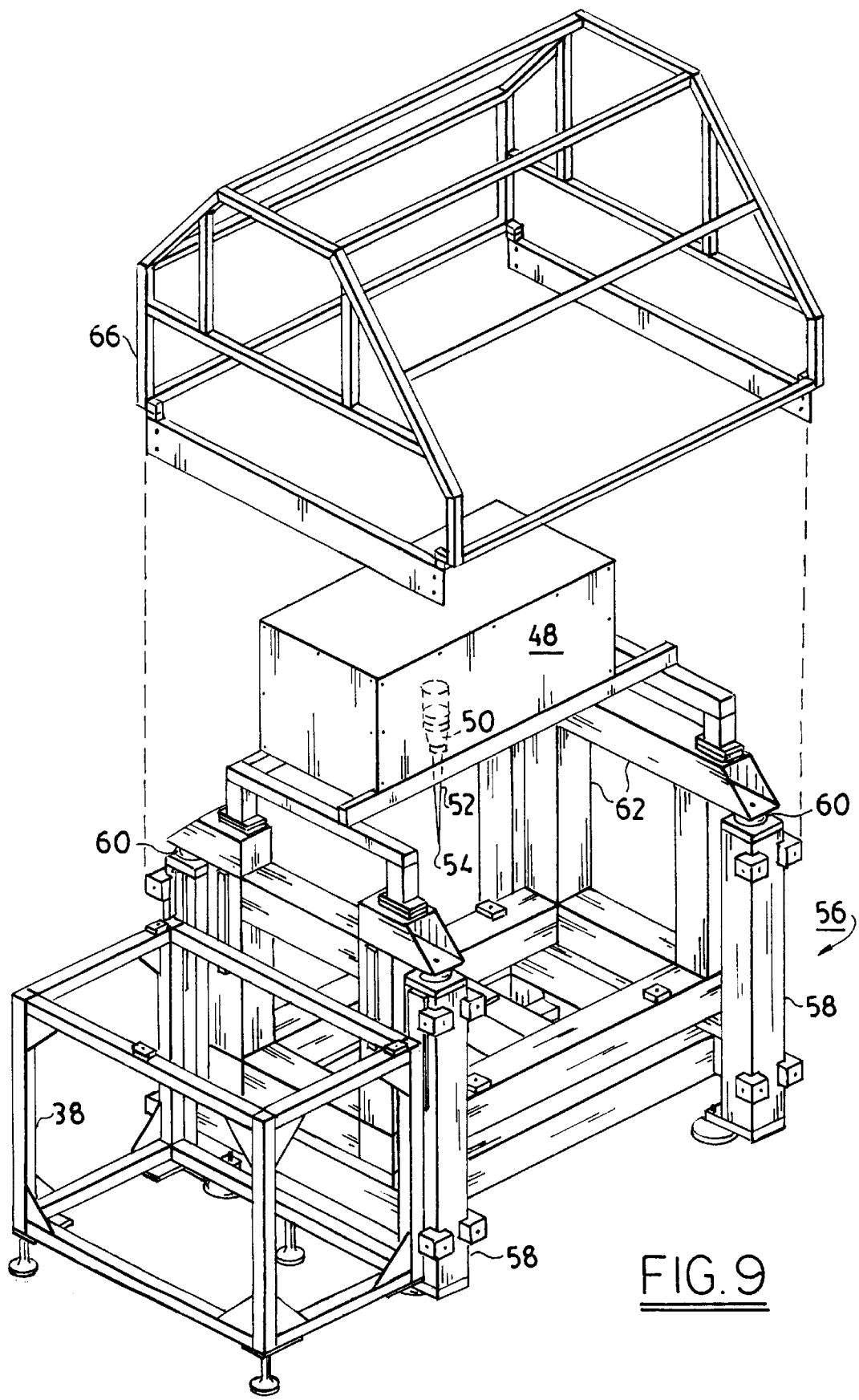
FIG. 9 is an exploded perspective view illustrating the framework of the mechanism providing the profile measurement system and showing the enclosure of the optics and the head or objective of the optical system which extends from the enclosure to project a focussed laser beam for profile measurement.
Figure 9A:
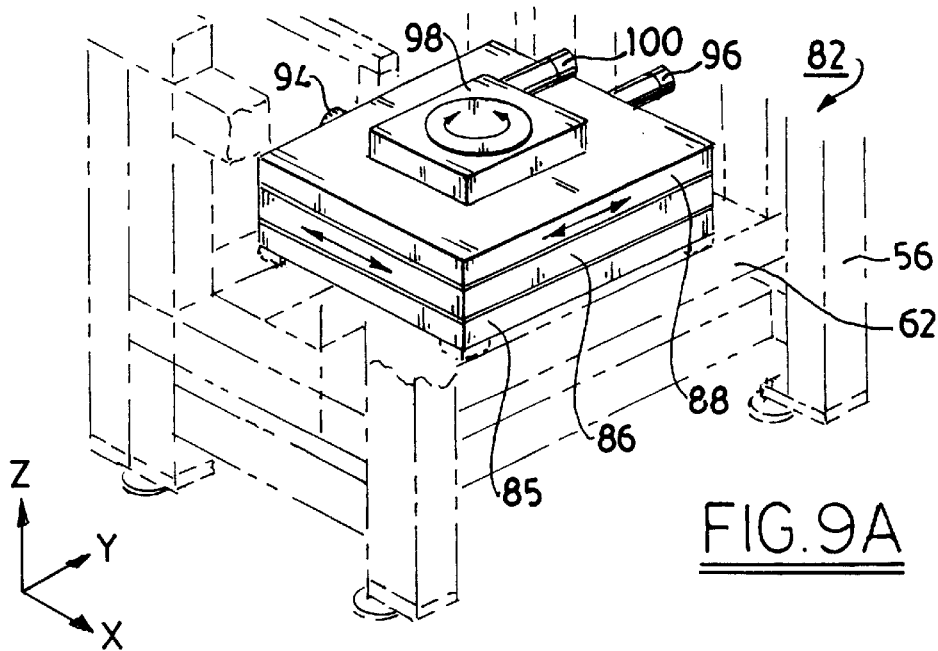
FIG. 9A is a perspective view showing the lower part of the holding and orienting positioner and particularly an XY stage or table for supporting the upper or tower portion of the positioner.
Figure 10:
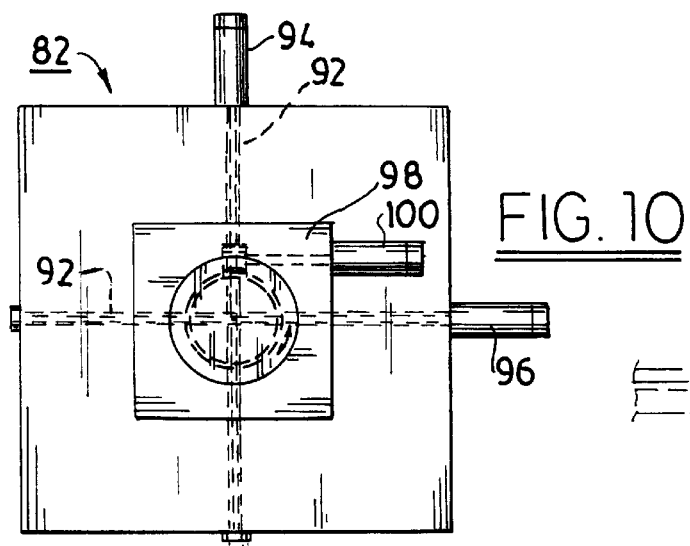
Figure 11:
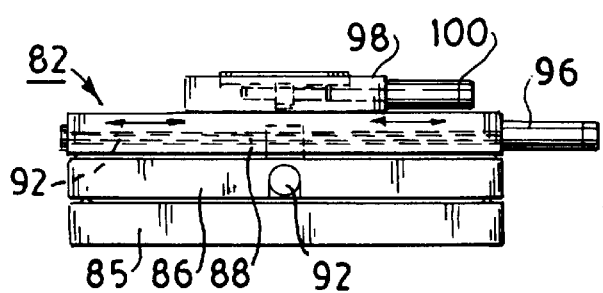
Figure 12:
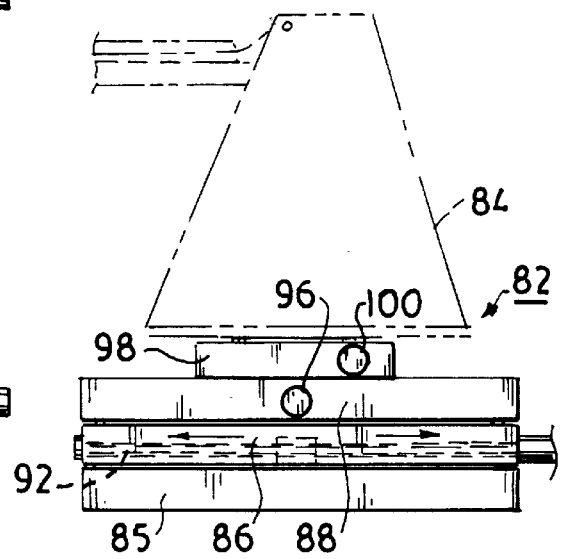
Figure 17:
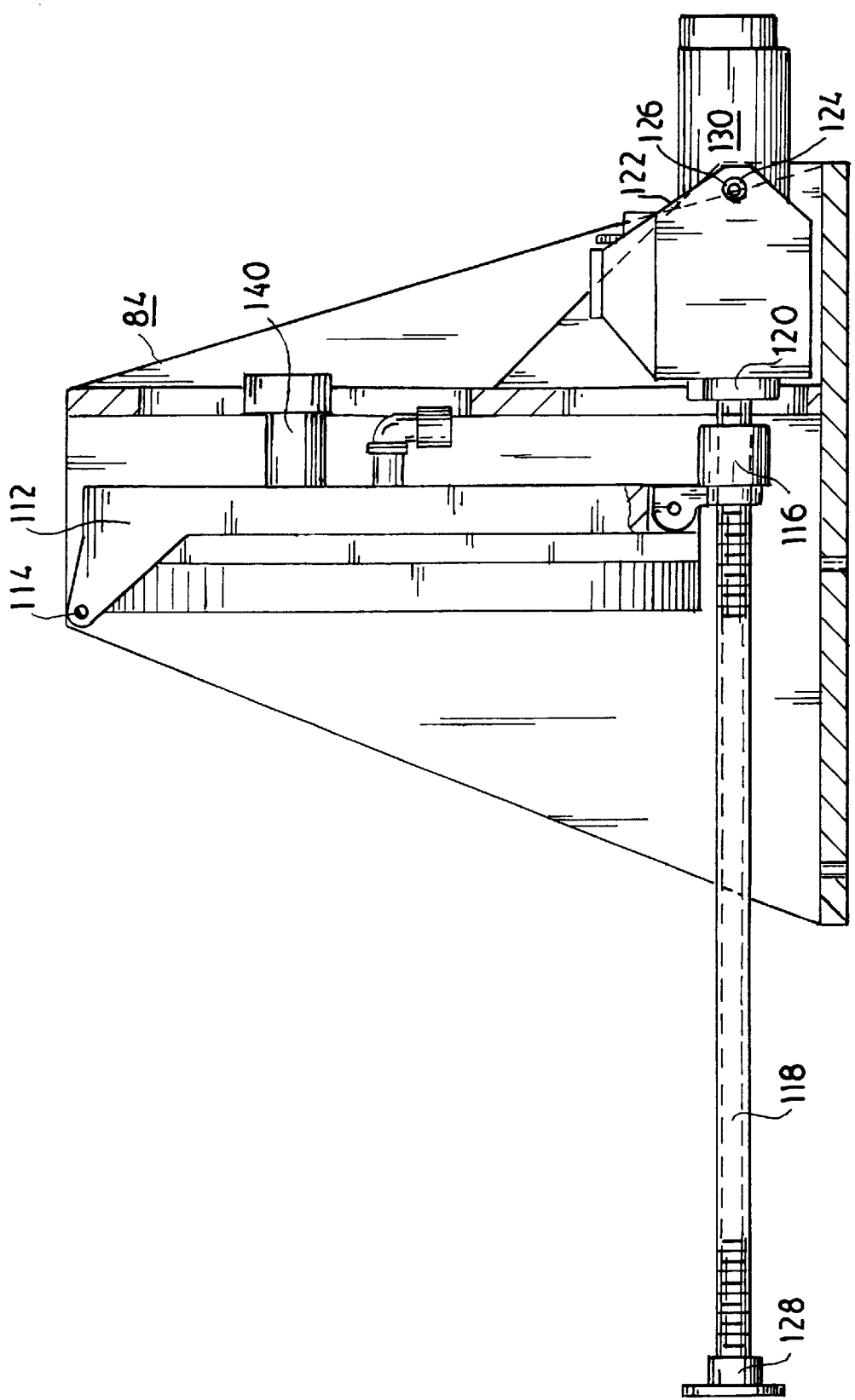
Figure 18:
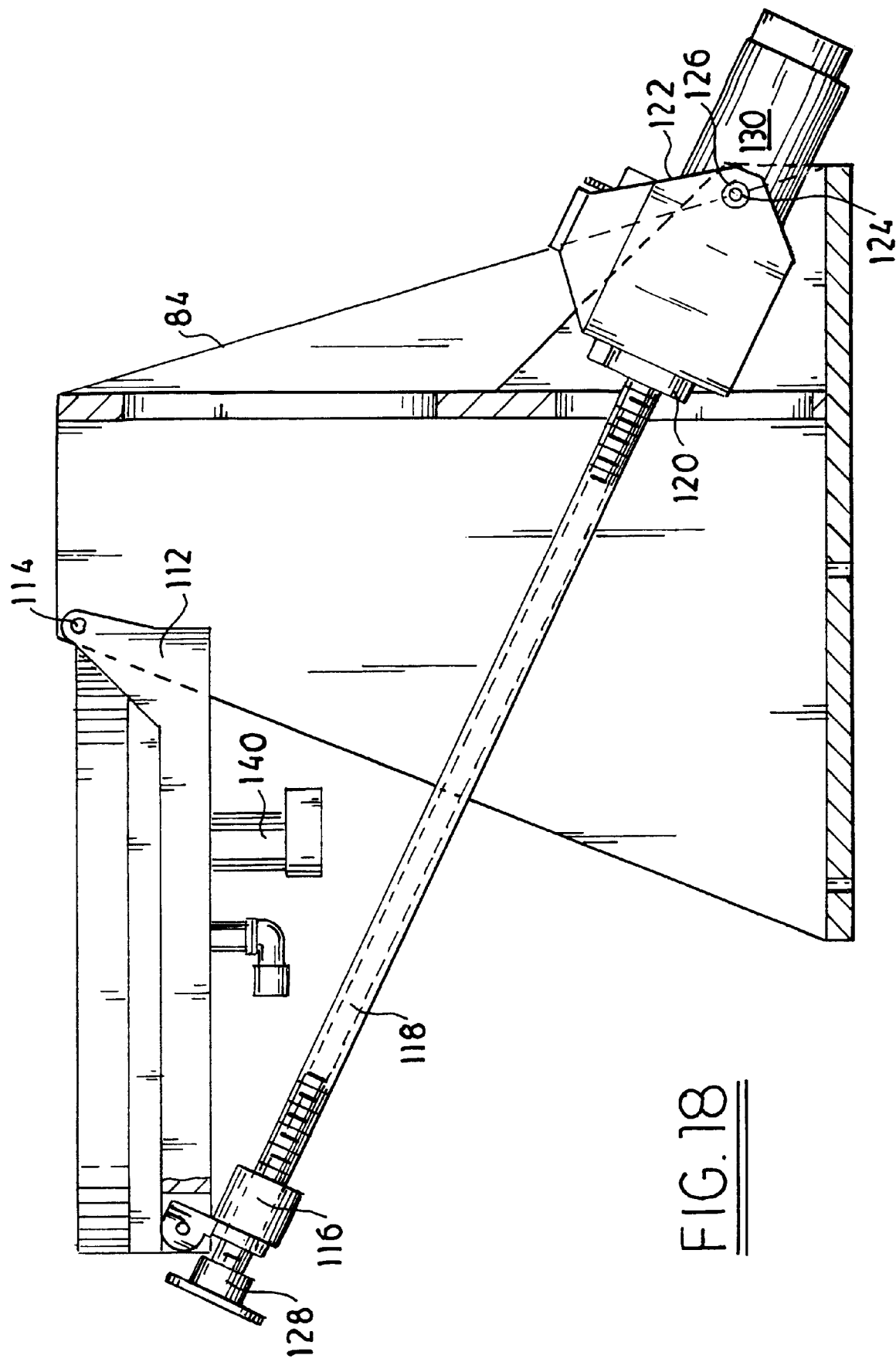
Figure 19:
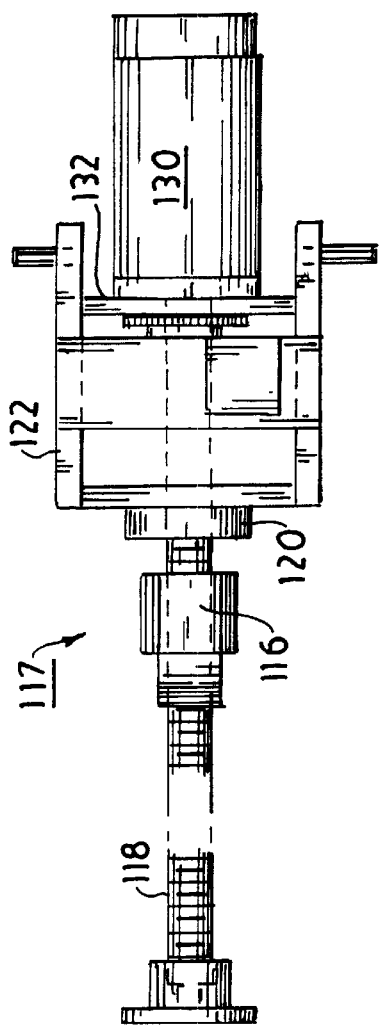
Figure 21:
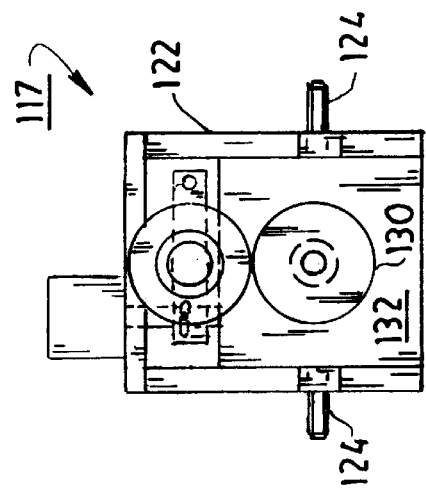
Figure 20:
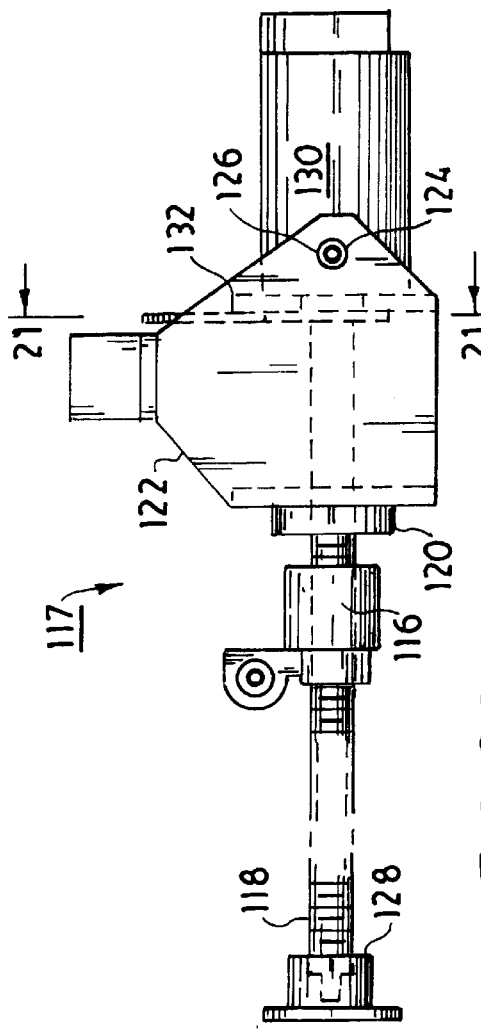
Figure 24:
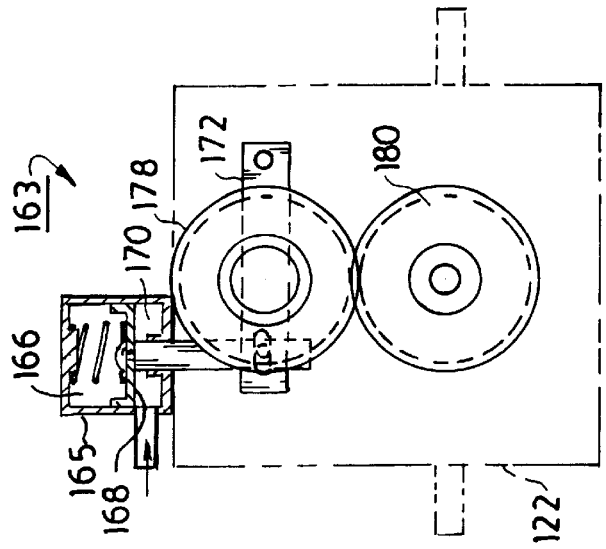
Figure 23:
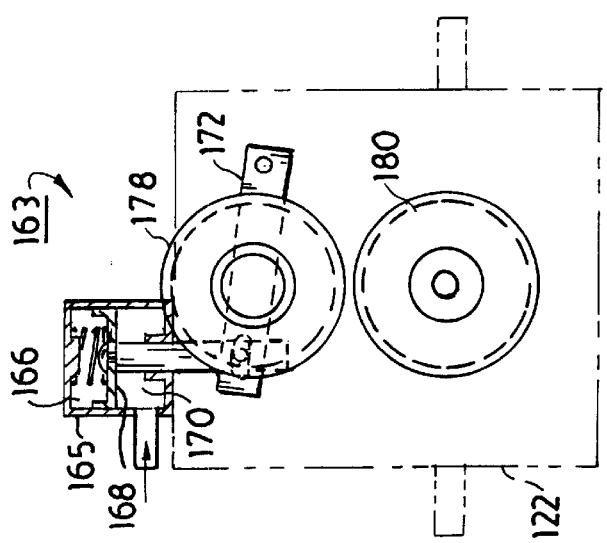
Figure 22:
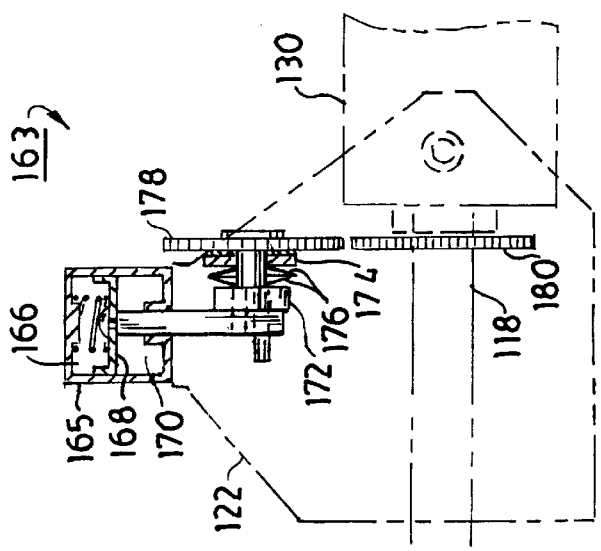
Figure 25:
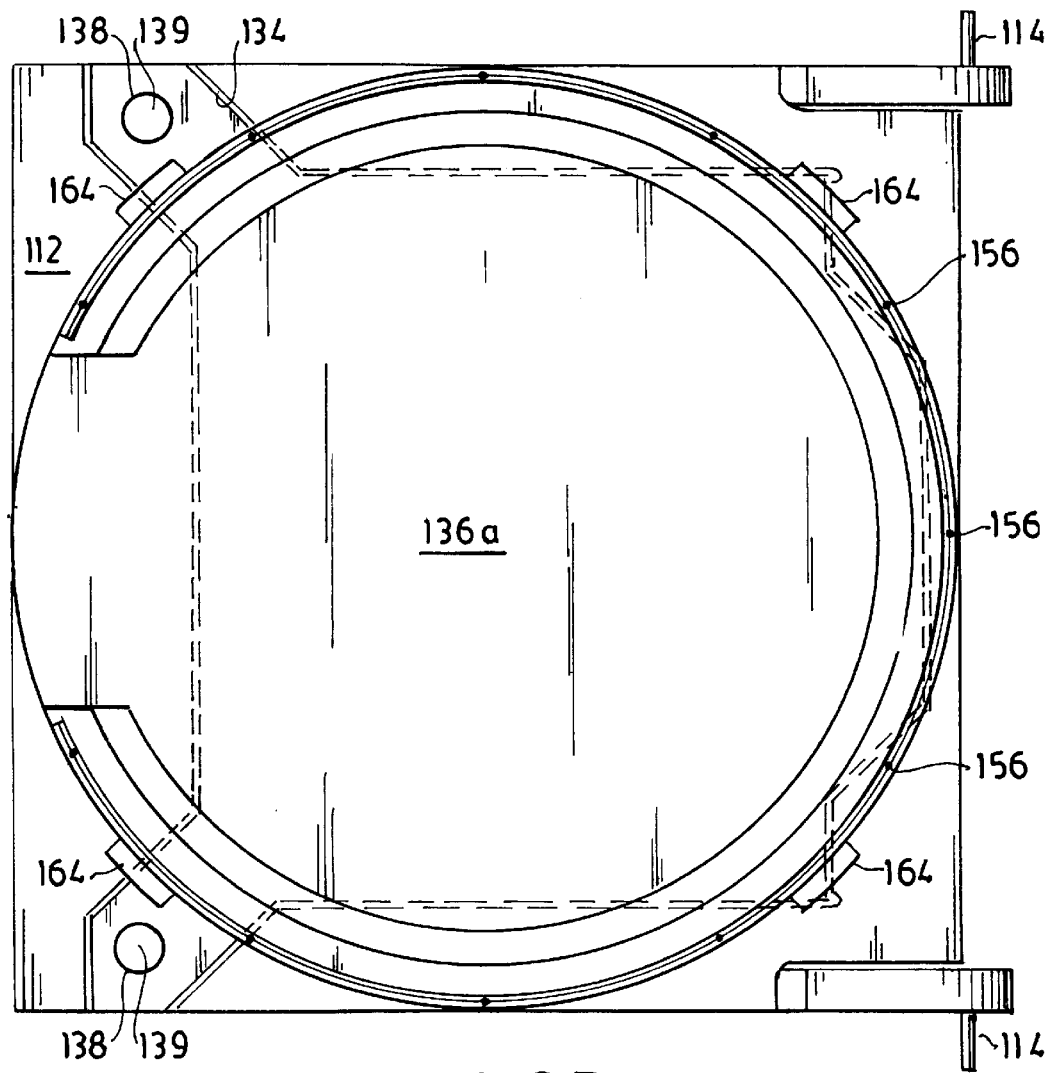
Figure 26:
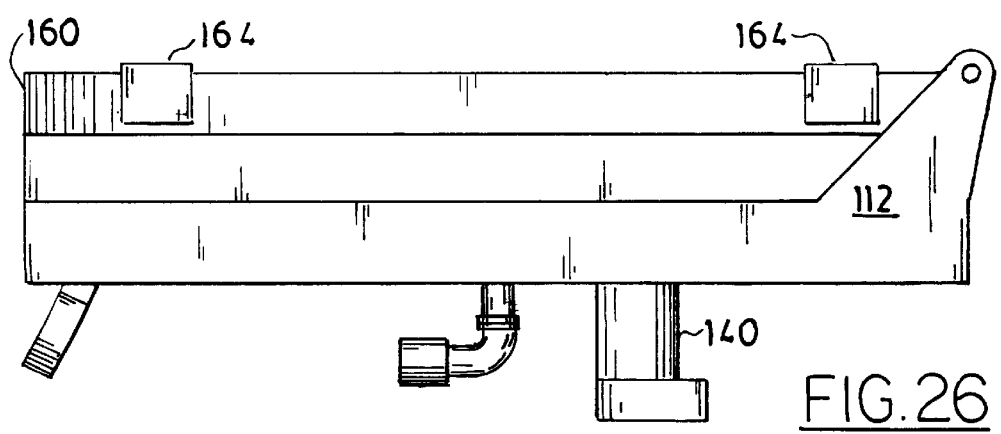
Figure 27:
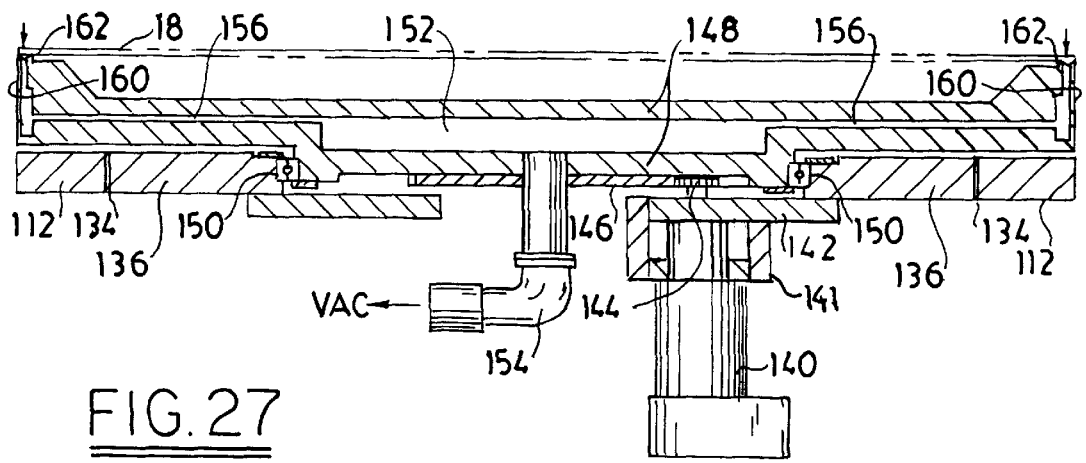
Figure 28:
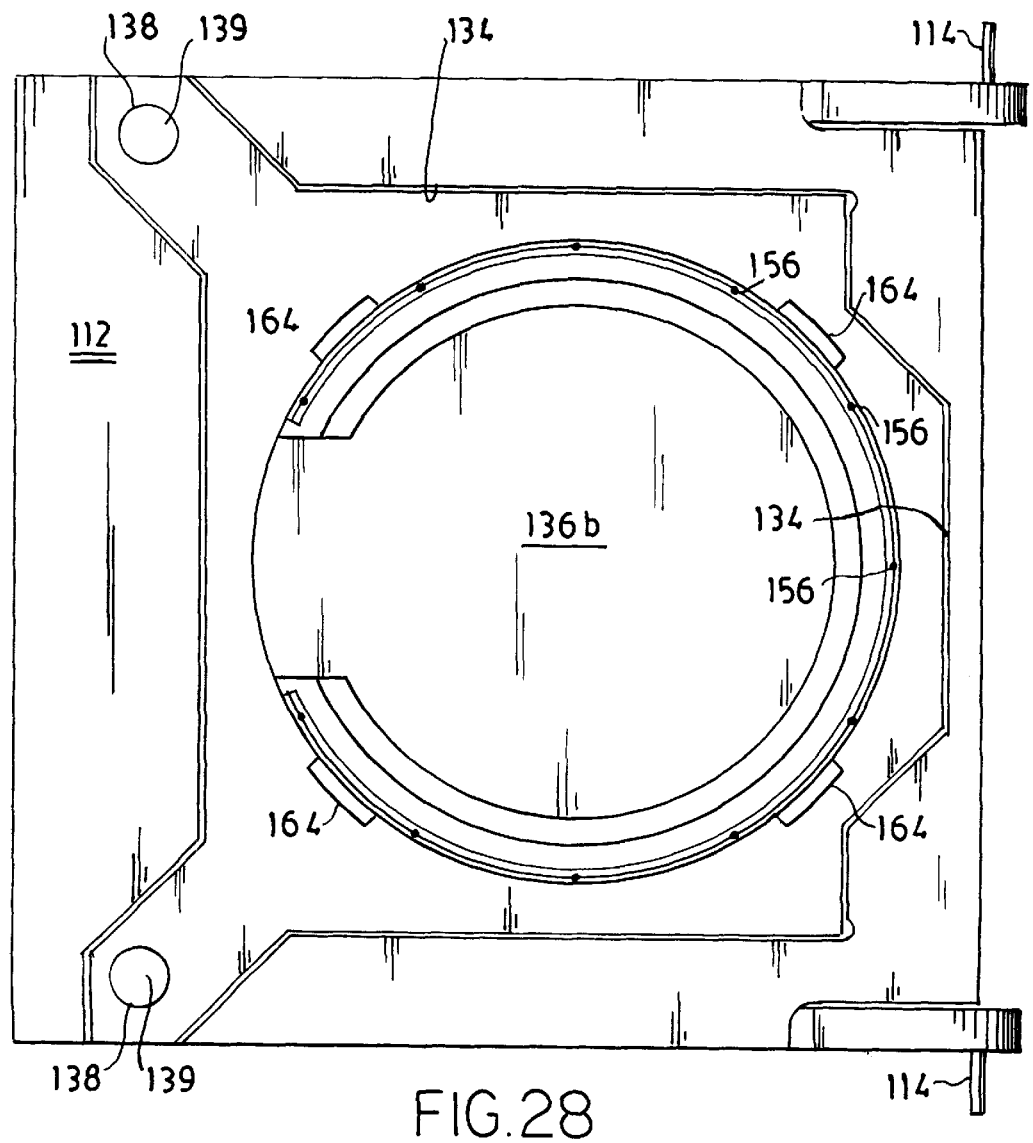

FIGS. 10, 11, and 12 are respectively plan, front elevation, and right side elevation of the table or stage shown in FIG. 9A;

FIGS. 13, 14, 15, and 16 are respectively plan, sectional elevation along line 14—14 in FIG. 13, rear elevational, and perspective views of the assembly of panels which forms the support structure of the positioner tower;

FIG. 17 is an elevational view in a section along a plane parallel to one side of the positioner tower showing a mechanism including a lead screw and a fail-safe brake assembly in relationship with a platform and chuck assembly on which a wafer workpiece is received and held with its working surface in a vertical orientation for profile measurements of the edge of the wafer;

FIG. 18 is a view similar to FIG. 17, but with the platform and chuck arranged so that the working surface of the wafer is in a horizontal position;

FIGS. 19 and 20 are plan and front elevational views of the lead screw (wafer and chuck tilting) mechanism;

FIG. 21 is an elevational view taken from the right end of the mechanism shown in FIG. 20 along a section through line 21—21, showing intermeshing spur gears which are part of the braking mechanism for the lead screw mechanism;

FIG. 22 is a diagrammatic side elevation of the braking mechanism in its released position;

FIG. 23 is a diagrammatic view from the right side of the braking mechanism in released position as shown in FIG. 22;

FIG. 24 is a view similar to FIG. 23 of the braking mechanism in engaged position to prevent sudden downward pivoting of the chuck and consequent damage to a wafer if air pressure to the profiler is lost;

FIG. 25 is a plan view of the tilting platform, the adaptor frame, and the vacuum chuck for receiving and retaining a wafer of diameter approximately equal to the width of the platform, the chuck and adaptor being positioned to receive wafers from the left side of the measurement chamber via a slot in the enclosure on the side thereof separating the measurement chamber from the loading chamber;

FIG. 26 is a front elevational view of the platform adaptor and chuck shown in FIG. 25;

FIG. 27 is a sectional elevational view through the adaptor and chuck which are shown in FIGS. 25 and 26; and FIG. 28 is a view similar to FIG. 25 but showing an adaptor and chuck for handling a wafer of diameter smaller than the wafer which is handled by the mechanism as shown in FIGS. 25, 26, and 27.

Referring to FIGS. 1–4 and 9, there is shown a surface profiler 10 including an automated optical surface profile measurement system in accordance with the invention. A loading chamber 12 contains a cassette dock 14 for receiving a cassette 16 containing one or a plurality of wafers 18 to be profiled. Dock 14 preferably is provided with alignment pins (not shown) matable with recesses in the underside of cassette 16 to accurately position the cassette in the loading chamber. Wafers are entered into the cassette with their working sides facing upwards by an operator at a remote station (not shown). A three-arm robotic server 20, is disposed next to cassette dock 18. Server 20 can move vertically by upward extension of main shaft 22, and by coordinated movement of first and second arms 24 and 26, respectively, around pivots 28 and 30 can extend and/or rotate third server arm 32 as desired through any plane parallel with the surfaces of wafers 18. Third arm 32 is provided at the extremity of its upper surface with vacuum-supplied ports defining a vacuum chuck for attaching to the rear surface of wafers to be moved. Cassette 16 is preferably open along the side facing the server to permit access of the server to the wafers. Also within loading chamber 12 is a prealigner 34 for centering and orienting each wafer. Preferably, loading chamber 12 is provided with a transparent, removable dust cover 36. Loading chamber 12 is supported by a framework 38 which also encloses conventional electrical and pneumatic components (not shown) of robotic server 20 and prealigner 34 within a base cabinet 40.

Adjacent loading chamber 12 and communicating via a slotted opening 42 is measurement chamber 44 containing a wafer holding and orienting positioner 46 described in greater detail herein below.

Positioned in the upper portion of measurement chamber 44 is optical enclosure 48 containing a laser phase differential profiling system (not visible in FIG. 9) having a head or objective lens 50 extending downwards to project a beam 52 to a focus 54, for example, a system as recited in U.S. Pat. No. 5,017,012 issued May 21, 1991 and assigned to Chapman Instruments, Inc. of Rochester, N.Y. USA. A main framework 56 for profiler 10 includes four stout cornerposts 58 supporting vibration isolation pads 60 on their upper ends. Suspended within framework 56 and resting on pads 60 is an isolated, floating framework 62 for supporting optical enclosure 48. Conventional electrical and pneumatic components (not shown) for operating the optical and mechanical elements of the profiling system in the measurement chamber are disposed within framework 56 in a base cabinet 64. A shroud frame 66 supporting a shroud 68 is attached to framework 56 to enclose the measurement chamber. Preferably, a transparent door 70 is provided in shroud 68 for manual access to positioner 46.

A control module 72 for controlling the profiling operations within the loading and measurement chambers is attached to the right end of framework 56, having a base cabinet 74 housing a programmable central processing unit (not visible in FIG. 1) and a work control station including a keyboard 76 and one or more programming and testing monitors and/or electronics racks 78,80. Of course, other peripherals such as a printer, a modem, a hard disc drive, and the like may be incorporated in control module 72 as required.

Figure 1:
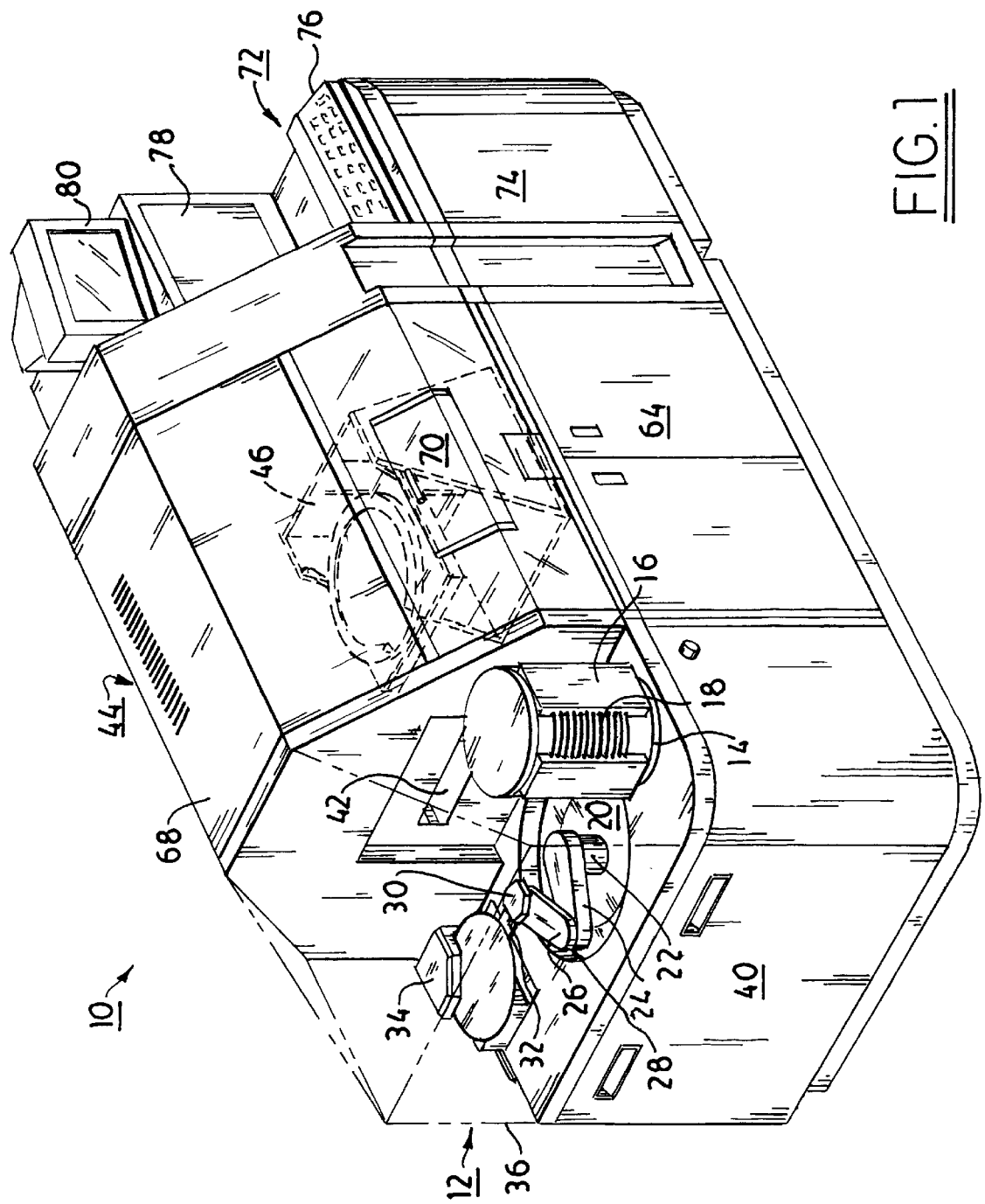
Figure 2:
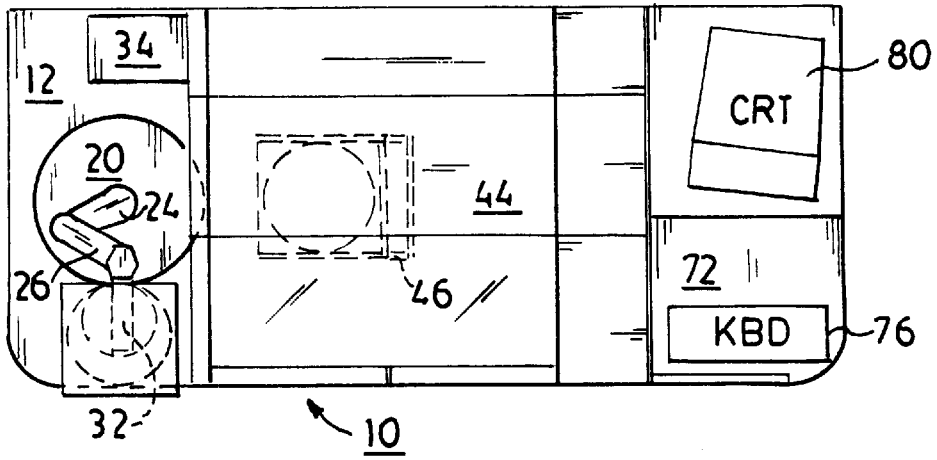
Figure 3:
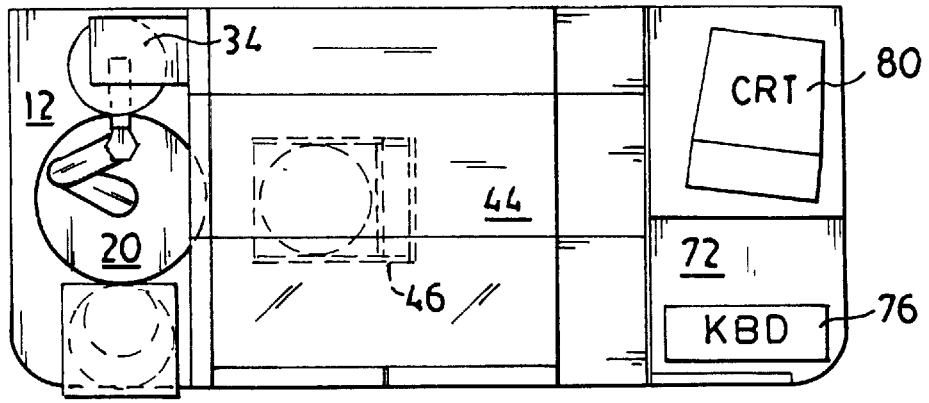
Figure 4:
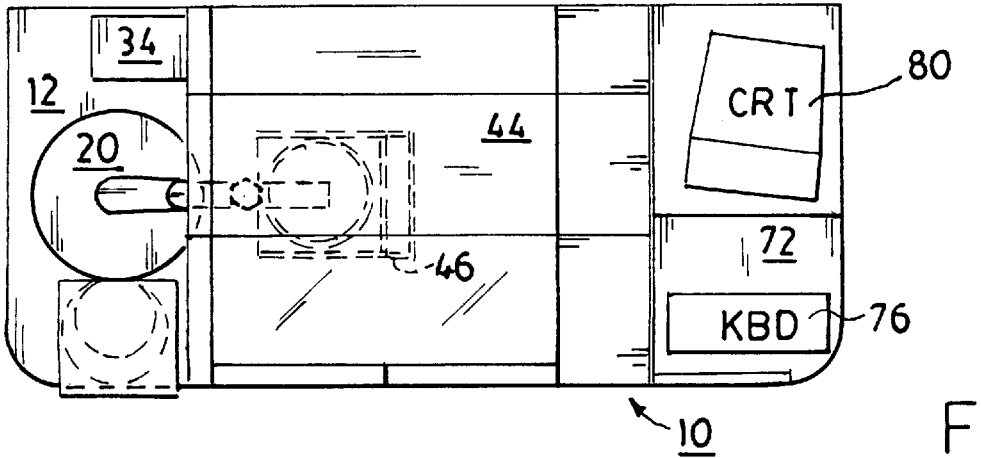

Disposed within measurement chamber 44 adjacent to slotted opening 42 is positioner 46 for receiving a wafer from robotic server 20, as shown in FIGS. 2–4. Positioner 46 is capable of motion in five independent axes to receive, hold, and orient a wafer for measurement, as shown in FIG. 5 and described in greater detail hereinbelow. A wafer mounted on positioner 46 may be moved left-to-right of profiler 10 (X direction); front-to-back (Y direction); rotated about a vertical axis through positioner 46 ($\alpha$ rotation); rotated about its own axis ($\beta$ rotation); and tilted through 90° about a horizontal axis through the positioner and outside the wafer ($\gamma$ direction).

Positioner 46 comprises a lower XY stage 82, as shown in FIGS. 9A–12, for providing independent linear motion in the X and Y directions and a rotary motion, and an upper or "tower" stage 84, as shown in FIGS. 12–18 for providing $\beta$ and $\gamma$ rotary motions.

Lower stage 82 includes a bedplate 85 mounted on floating framework 62. A Y-direction plate 86 rides on linear bearings (not visible) on bedplate 85, and an X-direction plate 88 rides on linear bearings (not visible) on plate 86.

The X- and Y-plates are moved by lead screws 90 and 92, respectively, driven by controllable electric motors 94 and 96, respectively. A rotatable stage 98 driven by controllable motor 100 is mounted on top of plate 88 for receiving and rotating tower 84 in α rotation.

Tower 84 is specially designed to permit mounting and β and γ rotation of a wafer. Tower 84 includes a rectangular baseplate 102 for mounting on rotatable stage 98, opposing trapezoidal sideplates 104, central wall 106, and a pair of gussets 108, as shown in FIGS. 13–16. Wall 106 is provided with an upper opening 109 and a lower opening 110. Preferably, these plates are cut or stamped from sheet aluminum stock and are then bolted together.

Referring to FIGS. 17–21, a wafer mounting and tilting mechanism is shown. Tilt stage 112 for holding and orienting a wafer is pivotably connected to tower 84 via hinge pins 114 for γ-rotation about a horizontal axis through tower 84. At its opposite edge, stage 112 is pivotably connected via threaded follower 116 to a tilting mechanism 117 shown in FIGS. 19–21 and disposed through lower opening 110 in wall 106. Lead screw 118 threadedly drives follower 116 and is journalled by bearings 120 in bracket 122, which is pivotably mounted on pivot pins 124 through bores 126 in gussets 108. Lead screw 118 is provided with a stop 128 at one end to limit the travel of follower 116, and is coupled to drive motor 130 at the other end. Motor 130 is mounted on plate 132 of bracket 122.

Referring to FIGS. 17–18 and 25–28, tilt stage 112 is provided with a recess 134 on its surface for receiving an adapter formed to accommodate a wafer of a given diameter, for example, an adapter 136a for a large diameter wafer as shown in FIG. 25, and an adapter 136b for a smaller diameter wafer as shown in FIG. 28. Adapters can be provided for any desired range of wafer diameters, for example, profiler 10 can be adapted to accommodate wafers 4, 6, 8, 12 inches in diameter, and 200 mm and 300 mm in diameter. Each adapter is provided with guide holes 138 which fit snugly over thumbscrews 139 in stage 112 for fixing accurately the position of the adapter in the stage.

Tilt stage 112 is provided with a fixed stage and a drive motor 140 mounted on bracket 142, the motor shaft supporting a first spur gear 144. Alternatively, motor 140 may be provided with a conventional reduction gearbox 141 comprising gear 144, as desired. Each adaptor 136 is provided with a second spur gear 146 flush mounted on the underside of a rotatable stage 148 and in meshing and driven relationship with first spur gear 144. Rotatable stage 148 is supported for rotation on tilt stage 112 by bearing 150.

Stage 148 is provided with a central vacuum plenum 152 connectable via rotary fitting 154 to a vacuum source through upper opening 108 in tower 84. A plurality of vacuum ports 156 connect central plenum 152 with the upper surface of stage 148 immediately inboard of outer wall 160, as shown in FIGS. 25 and 27. The central portion of the upper surface of stage 148 is relieved, forming an annular rim 162 for supporting a wafer near its outer edge. Ports 156 provide vacuum to the underside of a wafer 18 outboard of rim 162 for holding the wafer on the positioner. Stage 148 is further provided with a plurality of restraining pins 164, preferably four disposed radially at 90° from one another, for centering the wafer on the stage. Stage 148 thus defines a vacuum chuck for holding and orienting a wafer on the positioner.

Profiler 10 is dependent for proper operation upon electric and vacuum supplies. Electric power failure is likely to be accompanied by vacuum failure. To prevent rapid deorientation and possible damage to a wafer being profiled, for example, in the horizontal position as shown in FIG. 18, a fail-safe braking mechanism 163 is provided to gently but firmly arrest any relaxing rotation of lead screw 118 in the event of power loss to motor 130. Referring to FIGS. 22–24, bracket 122 is provided with a housing 165 having an upper chamber 166 having a spring-driven piston 168 therein and maintained in a cocked state during normal operation by pressurized air delivered to a lower chamber 170. Piston 168 is operationally connected to a pivotable cross-arm 172 carrying a non-rotating spacer 174, a pair of opposed clutch disks 176, and a rotatable first spur gear 178. One of the clutch disks is fixed to the cross-arm and cannot turn, while the other is fixed to gear 178, the two washers thus forming a frictional brake therebetween. Lead screw 118 is provided with a second spur gear 180. When pressurized air is supplied to chamber 170, gears 178 and 180 are held apart and lead screw 118 is free to turn. When air pressure is lost to chamber 170, as in a power failure, spring-loaded piston 168 is urged downwards, driving gear 178 to mesh with gear 180. The axial loading on the clutch disks is preset such that the gears mesh with minimal shock to the system, and particularly to the wafer, but the gears are almost immediately arrested from further rotation. When services are restored to the profiler, the piston is automatically raised and the brake is reset.

In operation, an operator loads a cassette holding as many as thirty wafers, all having the same diameter, into the cassette dock. The proper size positioner adapter is selected and installed on the tower. The machine is programmed and operated via the programmable CPU to perform the desired schedule of measurements on each wafer and to provide results of the measurements to the control station.

The robotic server enters the cassette below the first wafer, attaches to the wafer via the server vacuum chuck, withdraws the wafer from the cassette, inserts the wafer into the prealigner, and withdraws. The prealigner attaches to the wafer via a prealigner vacuum chuck, spins the wafer against peripheral alignment pins to center the wafer on the chuck, and stops the rotation of the wafer at a predetermined rotational angle, using a sensed fiducial mark, preferably a notch, on the edge of the wafer. The robotic server returns to the prealigner, retrieves the wafer, and extends the centered and oriented wafer through the slotted entrance to the measurement chamber, all as shown in FIGS. 2–4. The positioner is oriented to a reference position of all moving elements and advances to meet the server. The wafer is transferred to the positioner adapter to which it is attached by vacuum. The server withdraws, selects the next wafer for profiling, and loads it into the prealigner.

The positioner uses a programmed combination of its five modes of motion to position a first surface of the wafer at focus 54 for profiling. If a working surface profile is desired, as illustrated in FIG. 7, the positioner assumes the attitude shown in FIG. 18. The positioner becomes motionless and the beam is translated across a predetermined area of the surface.

When the first measurement is complete, the positioner automatically repositions the wafer for the next measurement. If an edge bevel measurement is desired, the tilt lead screw motor drives the lead screw by a preset amount to tilt the wafer to the proper declination angle, for example 22°, and the lower stage rotation and translation motors rotate and translate the tower to bring the wafer to a predetermined horizontal angle to the beam so that the beam can be traversed across the bevel surface.

When an edge crown measurement is desired, the tilt lead screw motor drives the lead screw by a preset amount to tilt the wafer to a 90° declination in the γ direction, and shown in FIG. 17, and the lower stage motors drive the tower to a preselected position and orientation. When the edge crown measurement is to be in the wafer's axial direction, the positioner is stationary and the beam traverses across the crown, as shown in FIG. 8. When the measurement is to be circumferential, the beam is held stationary and the wafer is β-rotated through a desired central angle, as shown in FIG. 6.

When all measurements are complete, the positioner returns to its reference position. The robotic server retrieves the wafer from the positioner, replaces it into the cassette, retrieves the second wafer from the prealigner, installs the second wafer onto the positioner, and transfers a third wafer from the cassette to the prealigner. This sequence is followed until all the wafers have been profiled as desired.

For quick, individual surface profiles, individual wafers can be inserted manually through the front door in the measurement chamber shroud and mounted on the positioner by an operator using a vacuum wand. The CPU is alternatively programmed for manual installation of the wafer, and the desired measurements are then carried out automatically.

From the foregoing description it will be apparent that there has been provided an improved, fully automated surface profiling system wherein a holding and orienting positioner capable of motion in five independent axes is supplied with wafers sequentially by a robotic server, and wherein the working surface, edge bevel, and edge surface of a wafer can be profiled in sequence without repositioning of the wafer on the positioner. Variations and modifications of the herein described system, in accordance with the invention, will undoubtedly suggest themselves to those skilled in this art. Accordingly, the foregoing description should be taken as illustrative and not in a limiting sense.

What is claimed is:

1. A system for measuring the surface profile of a substrate, comprising:
   a) a phase differential laser optical scanning system for scanning the substrate surface;
   b) a positioner for holding and orienting the substrate for scanning;
   c) a robotic server for supplying the substrate to the positioner for scanning and for removing the substrate from the positioner after scanning, and for managing the movement of substrates between a substrate source and said positioner; and
   d) a central processing unit for controlling and coordinating the operations of said positioner, server, and optical scanner and for analyzing data from said optical scanning to provide said surface profile.

2. A system in accordance with claim 1 wherein said positioner comprises a first motorized plate for translating the substrate along a first axis in a first linear direction to position said substrate for scanning.

3. A system in accordance with claim 2 wherein said positioner further comprises a second motorized plate for translating the substrate along a second axis in a second linear direction orthogonal to said first linear direction to position said substrate for scanning.

4. A system in accordance with claim 3 wherein said positioner further comprises a first motorized rotational assembly for rotating said substrate about a third axis passing through said positioner and being orthogonal to said first and second axes to position said substrate for scanning.

5. A system in accordance with claim 4 wherein said positioner further comprises a second motorized rotational assembly for rotating said substrate about a fourth axis passing through said positioner and being contained in a plane parallel to a plane containing one of said first and second axes to position said substrate for scanning.

6. A system in accordance with claim 5 wherein said positioner further comprises a third motorized rotational assembly for rotating said substrate about a fifth axis passing through and orthogonal to a surface of said substrate to position said substrate for scanning.

7. A system in accordance with claim 6 wherein said third motorized rotational assembly includes a vacuum chuck for holding said substrate on said positioner.

8. An apparatus for automatically measuring the surface profile of a surface of a substrate, comprising:
   a) a frame;
   b) a measurement chamber disposed on said frame, said measurement chamber including a phase differential laser optical scanning system having an optical objective providing a focussed laser beam for scanning said surfaces to provide data relating to the roughness profiles thereof
   c) a multiple-axis positioner disposed in said measurement chamber and mounted on said frame for receiving, holding, and orienting said substrate to place said surface to be scanned in said laser beam, said positioner including a first motorized plate for translating the substrate along a first axis in a first linear direction, a second motorized plate connected to said first plate for translating the substrate along a second axis in a second linear direction orthogonal to said first linear direction, a first motorized rotational assembly disposed on one of said first and second plates for rotating said substrate about a third axis passing through said positioner and being orthogonal to said first and second axes, a second motorized rotational assembly disposed on said first motorized rotational assembly for rotating said substrate about a fourth axis passing through said positioner and being contained in a plane parallel to a plane containing one of said first and second axes, and a third motorized rotational assembly disposed on one of said first and second motorized rotational assemblies for rotating said substrate about a fifth axis passing through and orthogonal to a surface of said substrate;
   d) a loading chamber disposed on said frame adjacent to, and in communication with, said measurement chamber, said loading chamber including a loading dock for receiving a cassette holding said substrate to be scanned, and a robotic server for transferring substrates sequentially from said cassette to said positioner, and thence to said cassette; and
   e) a control station disposed on said frame, said control station including a programmable central processing unit for receiving programming information relating to measurements to be performed, for controlling and coordinating operations of the electrical, mechanical, optical, and pneumatic elements of said apparatus, and for recording and analyzing data obtained from said scanning of said substrate surface.

9. An apparatus in accordance with claim 8 further programmable to scan sequentially a plurality of surfaces on said wafer.

10. An apparatus in accordance with claim 8 wherein said cassette is loadable with a plurality of wafers, and wherein said central processing unit is programmable to cause each of said wafers to be scanned in continuous sequence until all of said wafers have been so scanned.

11. An apparatus in accordance with claim 10 wherein said central processing unit is further programmable to cause a plurality of surfaces on each of said wafers to be scanned sequentially.

12. An apparatus in accordance with claim 8 further comprising a pre-aligner for centering and rotationally orienting each substrate to be scanned.

13. A system for measuring the surface profile of a substrate, comprising:

a) a phase differential laser optical scanning system for scanning the substrate surface;

b) a positioner for holding and orienting the substrate for scanning, said positioner including a first motorized plate for translating the substrate along a first axis in a first linear direction, a second motorized plate connected to said first plate for translating the substrate along a second axis in a second linear direction orthogonal to said first linear direction, a first motorized rotational assembly disposed on one of said first and second plates for rotating said substrate about a third axis passing through said positioner and being orthogonal to said first and second axes, a second motorized rotational assembly disposed on said first motorized rotational assembly for rotating said substrate about a fourth axis passing through said positioner and being contained in a plane parallel to a plane containing one of said first and second axes, and a third motorized rotational assembly disposed on one of said first and second motorized rotational assemblies for rotating said substrate about a fifth axis passing through and orthogonal to a surface of said substrate;

c) a robotic server for supplying the substrate to said positioner for scanning and for removing the substrate from said positioner after scanning; and d) a central processing unit for controlling and coordinating the operations of said positioner, server, and optical scanner and for analyzing data from said optical scanning to provide said surface profile.

14. A system in accordance with claim 13 further comprising a pre-aligner for cooperating with said robotic server for centering and rotationally orienting each substrate to be scanned prior to said substrate being mounted on said positioner.

* * * * *